United States Patent
Fox

(10) Patent No.: US 9,991,692 B2
(45) Date of Patent: Jun. 5, 2018

(54) METHOD AND APPARATUS FOR SEALING MOTOR TERMINALS

(71) Applicant: Johnson Controls Technology Company, Plymouth, MI (US)

(72) Inventor: William Joseph Fox, Dover, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days. days.

(21) Appl. No.: 15/339,592

(22) Filed: Oct. 31, 2016

(65) Prior Publication Data

US 2017/0047725 A1    Feb. 16, 2017

Related U.S. Application Data

(63) Continuation of application No. 13/709,274, filed on Dec. 10, 2012, now Pat. No. 9,484,732.

(60) Provisional application No. 61/570,397, filed on Dec. 14, 2011.

(51) Int. Cl.
  *H02G 15/04* (2006.01)
  *H01B 1/02* (2006.01)
  *F25B 31/02* (2006.01)
  *H02G 1/14* (2006.01)

(52) U.S. Cl.
  CPC .......... *H02G 15/043* (2013.01); *F25B 31/02* (2013.01); *H01B 1/02* (2013.01); *H02G 1/14* (2013.01); *F25B 2400/07* (2013.01); *Y10T 29/49194* (2015.01)

(58) Field of Classification Search
  CPC ........ H02G 15/043; H02G 1/14; F25B 31/02; H01B 1/02
  USPC ....................................................... 174/77 R
  See application file for complete search history.

(56) References Cited

U.S. PATENT DOCUMENTS

| | | | |
|---|---|---|---|
| 4,037,046 A * | 7/1977 | Hoeg | H01B 17/306 |
| | | | 174/152 R |
| 4,964,788 A | 10/1990 | Itameri-Kinter et al. | |
| 5,231,248 A * | 7/1993 | Shah | H01B 1/026 |
| | | | 174/74 R |
| 5,596,176 A | 1/1997 | Everitt | |

(Continued)

OTHER PUBLICATIONS

Wood, W. et al. Hermetic Sealing with Epoxy. Mechanical Engineering. Mar. 1990, 1-3.

(Continued)

*Primary Examiner* — Timothy Thompson
*Assistant Examiner* — Charles Pizzuto
(74) *Attorney, Agent, or Firm* — Fletcher Yoder, P.C.

(57) ABSTRACT

A wire insulator apparatus includes an insulator/separator member, a cap portion, a tube and potting material. The insulator/separator member has apertures formed therein for receiving a plurality of wires. By threading the wires through the insulator/separator member, the wires are spaced apart so that a potting material can be molded to provide a complete seal from the environment, particularly conductive liquids such as ammonia, which may cause short-circuiting between the wires. Individual wires are terminated in the cap portion, and the cap portion, the insulator/separator member and the wire ends are positioned within a tube or a mold portion depending on the application, and a potting epoxy is fluidly inserted within the tube. The epoxy surrounds or encases the wire ends within the tube or mold to insulate the wire ends in an airtight seal.

20 Claims, 4 Drawing Sheets

(56) References Cited

U.S. PATENT DOCUMENTS

| | | | |
|---|---|---|---|
| 6,065,354 A | 5/2000 | Dinsmore | |
| 6,104,855 A | 8/2000 | Jeon | |
| 6,113,782 A * | 9/2000 | Leonard | B01D 63/022 210/321.61 |
| 6,273,754 B1 | 8/2001 | Bunch et al. | |
| 7,664,363 B1 * | 2/2010 | Mowery, Sr. | G02B 6/3887 385/137 |
| 2006/0048965 A1 | 3/2006 | Ootsuki | |
| 2011/0155415 A1 | 6/2011 | Steinich | |
| 2012/0282793 A1 * | 11/2012 | Brune | H01R 13/5202 439/278 |

OTHER PUBLICATIONS

Stakpole, Eric. Feb. 19, 2011, Potted Pass-Through. Msg 4. Message posted to http://openrov.com/forum/topics/potted-passthrough.
Bearing Wire Seals (BSWS) Conax Technologies Catalog. Jul. 22, 2011. www.conaxtechnologies.com.

\* cited by examiner

METHOD AND APPARATUS FOR SEALING MOTOR TERMINALS

CROSS-REFERENCES TO RELATED APPLICATIONS

This application is a continuation of U.S. patent application Ser. No. 13/709,274, entitled "METHOD AND APPARATUS FOR SEALING MOTOR TERMINALS," filed Dec. 10, 2012, which claims the benefit of and priority to U.S. Provisional Application No. 61/570,397, filed Dec. 14, 2011, entitled "METHOD AND APPARATUS FOR SEALING MOTOR TERMINALS," which are hereby incorporated by reference in their entirety.

BACKGROUND

The application generally relates to a method of sealing electric motor terminals. The application relates more specifically to a method and apparatus for sealing connections within a conductive environment.

Ammonia is a common, naturally occurring compound in the environment that breaks down naturally into hydrogen and nitrogen. Ammonia refrigeration is a cost effective and energy efficient method of processing and storing frozen and unfrozen foods. Ammonia refrigeration is also used in the chemical industry. Recently, air conditioning has been provided by ammonia refrigeration systems in office buildings, parks, and small buildings such as convenience stores.

Ammonia is electrically conductive and corrosive to many materials, e.g., copper wire used in high efficiency electric motors. Electrical connections, e.g., motor terminations of multiple conductors, which are exposed to ammonia in the environment, can present a risk of short circuit or other failure. Electrical conductors must be electrically insulated and sealed from ammonia vapor or liquid.

An example of a current motor connection arrangement is shown in FIG. 4. Lead wires 12 are soldered or crimped in a cap portion 28. The cap portion is then inserted into a recessed stub portion 29 attached to one end of a stud member 26. Stud member 26 may also include a hexagonal nut portion 27 to provide a surface for applying a wrench, for tightening threads on the stud member 26. An insulator board may be attached to stud member 26 for mounting stud member 26 to the compressor or motor housing 116. The lead wire terminations 12 in cap portion 28 are not insulated and would short circuit if exposed, e.g., to a conductive gas atmosphere or wet environment.

The innovation provides a method to make connections that electrically insulates the conductors while sealing out ammonia vapor or liquid. Currently the common process used for connecting electrical terminals in semi-hermetic compressors is stripping and soldering copper wires into a cap, then inserting the cap into a stub and crimping the cap. There is no provision made for insulating the electrical terminals and conducting parts, as the conventional refrigerants are non-conducting and thus pose no risk of short-circuiting exposed terminals.

What is needed is a method and device for sealing motor terminals in a semi-hermetic compressor using a conductive refrigerant, e.g., ammonia.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

In one embodiment a wire insulator for sealing motor terminals includes an insulator/separator member, a cap portion, a tube and potting epoxy. The insulator/separator member includes a plurality of apertures. The apertures are arranged for receiving and threading a plurality of wire strands through the insulator/separator member. The plurality of wire strands are separated to create a space for the potting epoxy to seal each of the wire strands from an environmental atmosphere such as ammonia. The cap portion is arranged to terminate the wire strands. The tube is positioned surrounding the cap portion, the insulator/separator member, the potting epoxy, and at least a portion of the plurality of wire strands.

In another embodiment a wire insulator includes an insulator/separator member, a cap portion, a hollow mold portion and potting epoxy. The mold portion encloses the insulator insulator/separator member, and the cap portion, and a plurality of lead wire strands. The mold portion includes a first end and a second end. The mold portion is open at the first end and attached to an insulator board at the second end. The potting epoxy infused into the mold portion to provide an airtight seal.

In a third embodiment a method for sealing wire terminations in a conductive atmosphere includes threading a plurality of lead wire strands through a plurality of apertures in an insulator/separator member, attaching the lead wire strands to cable conductors at a connection point; placing a casing over the assembled connector parts; and filling the casing with an airtight electrically insulated potting material to encase the connector assembly in the potting material.

Certain advantages of the embodiments described herein include the use of copper wound motors in an ammonia refrigeration environment with internal electrical connections made between two or more conductors.

Further, internal motor connections sealed from the refrigerant can be made as well as pass-through connections. Connection free motor windings and expensive multi-conductor pass-through devices are no longer required in the presence of ammonia.

The disclosure provides electrically insulated connections of multiple conductors in a semi-hermetic refrigeration compressor motor. The insulated connections are impervious to ammonia refrigerant vapor.

The application also discloses methods and devices to provide completely sealed electrical connections with separated conductors that are potted to protect the copper or other electrical conductor materials.

Alternative exemplary embodiments relate to other features and combinations of features as may be generally recited in the claims.

DETAILED DESCRIPTION OF THE EXEMPLARY EMBODIMENTS

Figure 1:
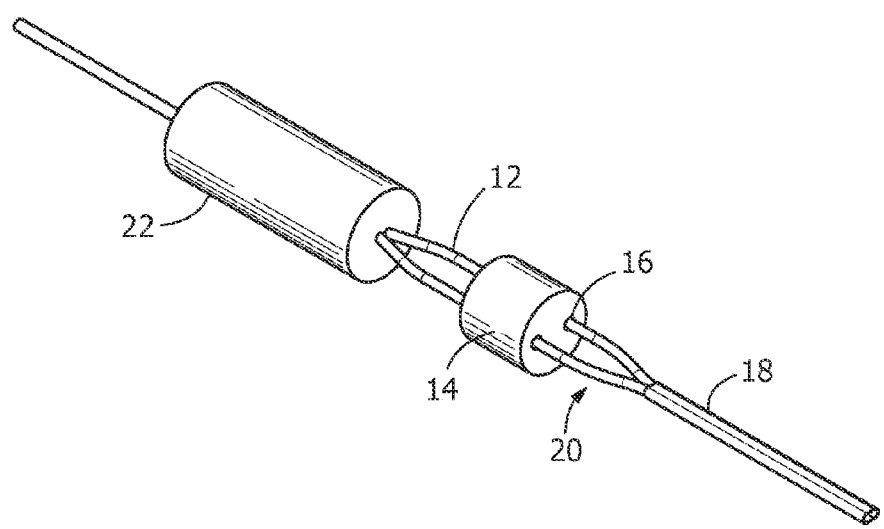
FIG. 1 shows an exemplary embodiment of a potted electrical connection device.
Figure 5:
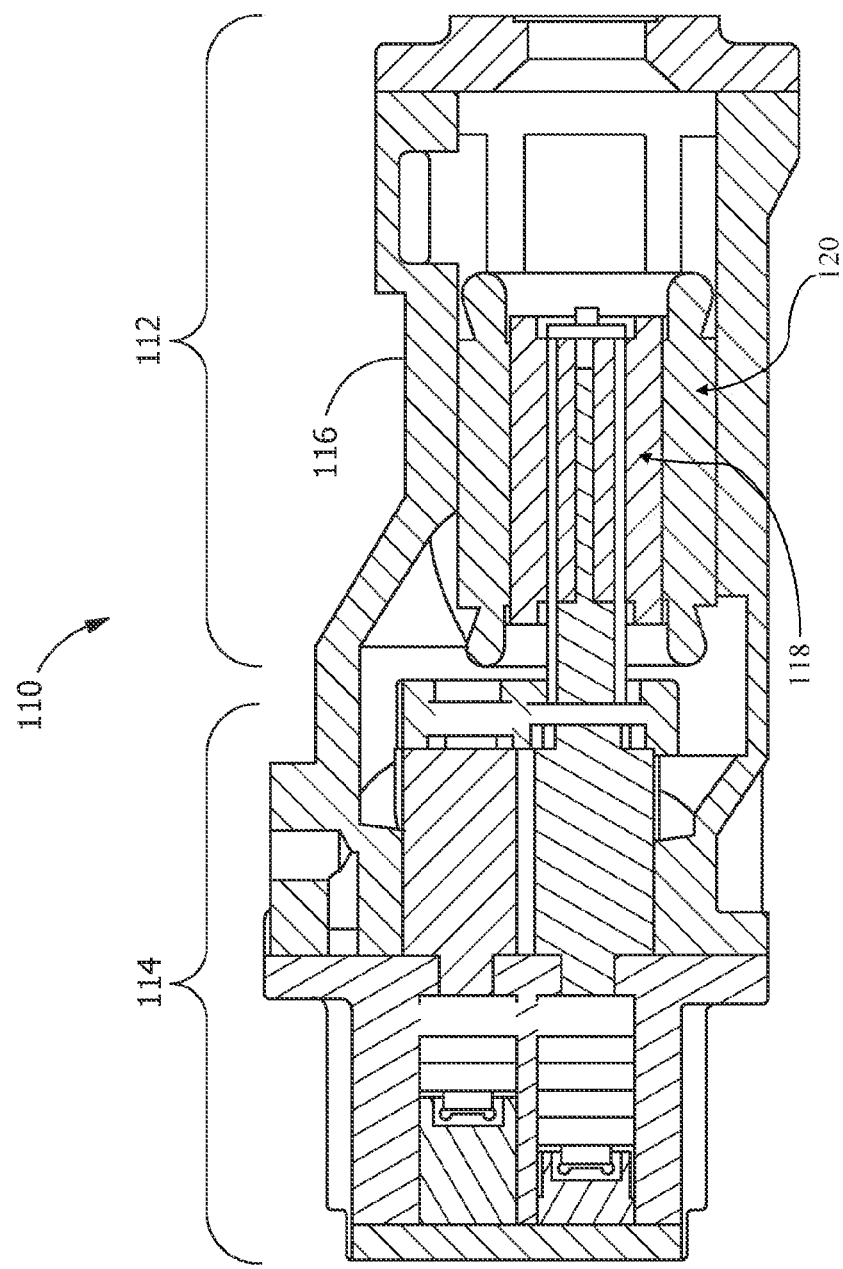
FIG. 5 shows an exemplary semi-hermetic compressor having a potted electrical connection device.

Referring to FIGS. 1 and 5, a semi-hermetic compressor 110 includes a motor 112 and a compressor portion 114. A semi-hermetic housing 116 encases both compressor portion 114 and motor 112. Motor 112 includes a stator 120 arranged about a magnetic core or rotor 118. Rotor 118 is made of steel laminations that generate magnetic fields when motor 112 is energized. When three phase AC power is applied, the magnetic field advances from one stator winding to the next, causing the magnetic field to rotate and drive rotor 118. An electrical connection device or leadwire connector 10 is provided at one end of semi-hermetic compressor 110 adjacent motor 112. In one embodiment, two or more lead wires or wire strands 12, e.g., conductors or motor windings from inside of motor 112 or compressor housing 116, may be threaded through a cylindrical or solid block insulator or casing 14. Insulator 14 has one or more passages 16 traversing therethrough. Passages 16 have internal diameter sufficient to accept lead wires 12. Passages 16 separate and insulate lead wires 12 from coming into contact with adjacent lead wires within insulator 14. Lead wires 12 pass through insulator 14 and are connected to a single lead wire or multi-conductor cable 18 at a connection point 20. At connection point 20, lead wires 12 may be soldered, crimped, or otherwise attached to lead wire or multi-conductor cable 18. Lead wires 12 are also threaded through a hollow insulating tube 22, preferably a heat-shrink tube.

Once the connection between lead wires 12 and lead wire/multi-conductor cable 18 is prepared, tube 22 is positioned over the entire assembly—insulator 14, lead wires 12 and the end portion of lead wire or multi-conductor cable 18. Finally, tube 22 is filled with a potting material 24. Potting material may be, e.g., epoxy, urethane, silicone or other suitable potting material as known to those skilled in the art. The heat—shrink tube 22 is then heated to shrink the tube 22 over the connection to be protected, e.g., using a hot air gun, oven or similar heating device. Tube 22 contracts, providing a snug fit over the irregularly shaped connection. Tube 22 provides, e.g., electrical insulation, protection from dust, solvents and other foreign materials, as well as strain relief.

Figure 2:
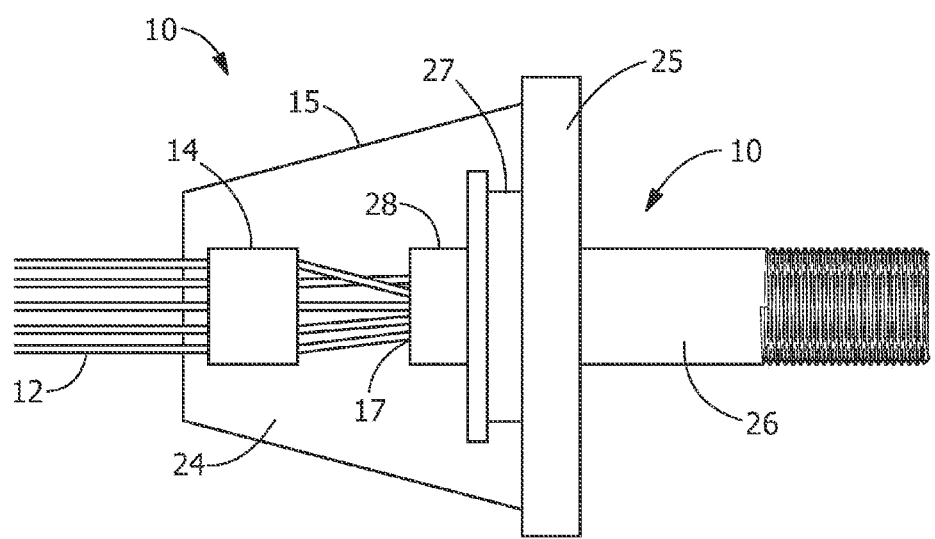
FIGS. 2 and 2A show an alternate embodiment of a potted electrical connection device.
Figure 2A:
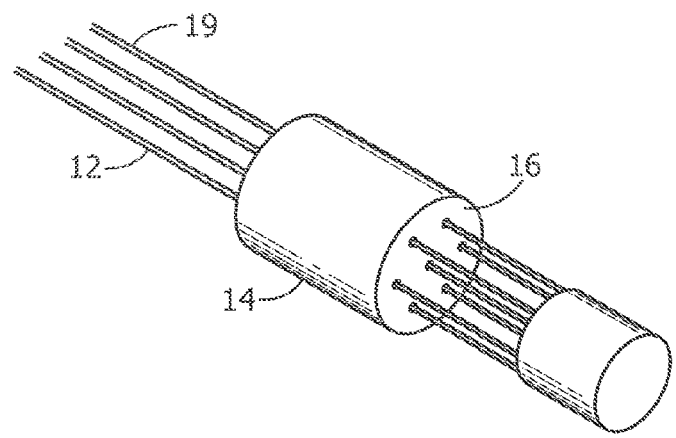
Figure 4:
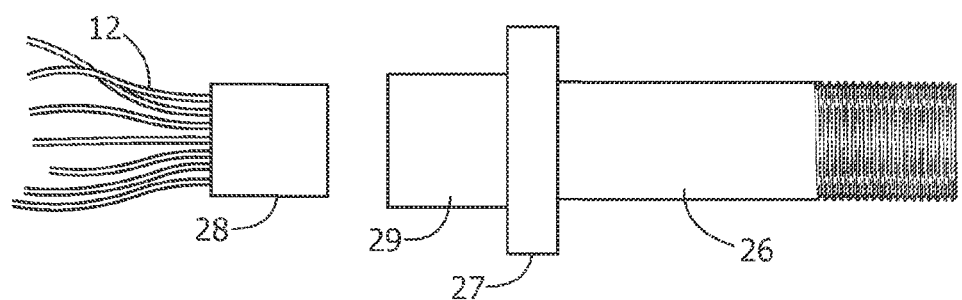
FIG. 4 shows an exemplary embodiment of a prior art motor terminal assembly.

Referring next to FIGS. 2 and 2A, in an alternate embodiment, lead wires 12, may be threaded through a cylindrical or solid block insulator 14. Insulator 14 has passages 16 traversing therethrough to accept lead wires 12. Passages 16 separate and insulate lead wires 12 from coming into contact with adjacent lead wires within insulator. The main function of item 14 is to separate the wires so that the potting material can provide a good seal. If the wires were kept together in a bundle and covered in a potting material, there is a possibility that a leak path could occur between the wires because the potting material was unable to fill all of the small voids between the wires. Lead wires 12 pass through insulator 14 and are connected to a cap portion 28. Lead wires 12 are stripped of insulation 19 at the wire ends 17 to expose a copper or aluminum conductor for termination inside cap portion 28. Wire ends 17 may be terminated within cap portion 28 by soldering, crimping, or other suitable means of making electrical terminations. Cap portion 28 is then inserted into a recessed stub portion 29 attached to one end of a stud member 26. Stud member 26 may also include a hexagonal nut portion 27 to provide a surface for applying a wrench, for tightening threads on the stud member 26. An insulator board 25 may be attached to stud member 26 for mounting stud member 26 to the compressor or motor housing 116.

A hollow mold portion or casing 15 is place over the insulator 14, lead wires 12, and cap portion 28. Mold portion 15 is open at the narrow end, and abuts against the insulator board 25 at the opposite, wider end. A liquid potting material 24, e.g., epoxy may be infused into the hollow bore interior of mold portion 15, filling all of the voids within mold portion 15, and encasing the components therein—i.e., insulator 14, lead wires 12, and cap portion 28—in an airtight seal when the potting epoxy cures.

In an alternate embodiment as shown in FIG. 2, lead wires 12 pass through insulator 14. Lead wires 12 may be, e.g., Teflon-coated copper wires, aluminum wire, and other insulated coatings. Insulator 14 separates individual wires 12 to permit epoxy or other potting material 24 (FIG. 1) to flow around and between individual wires 12 and wire ends 17 prior to curing, to provide insulation around all of the internal components of the leadwire connector 10.

Figure 3:
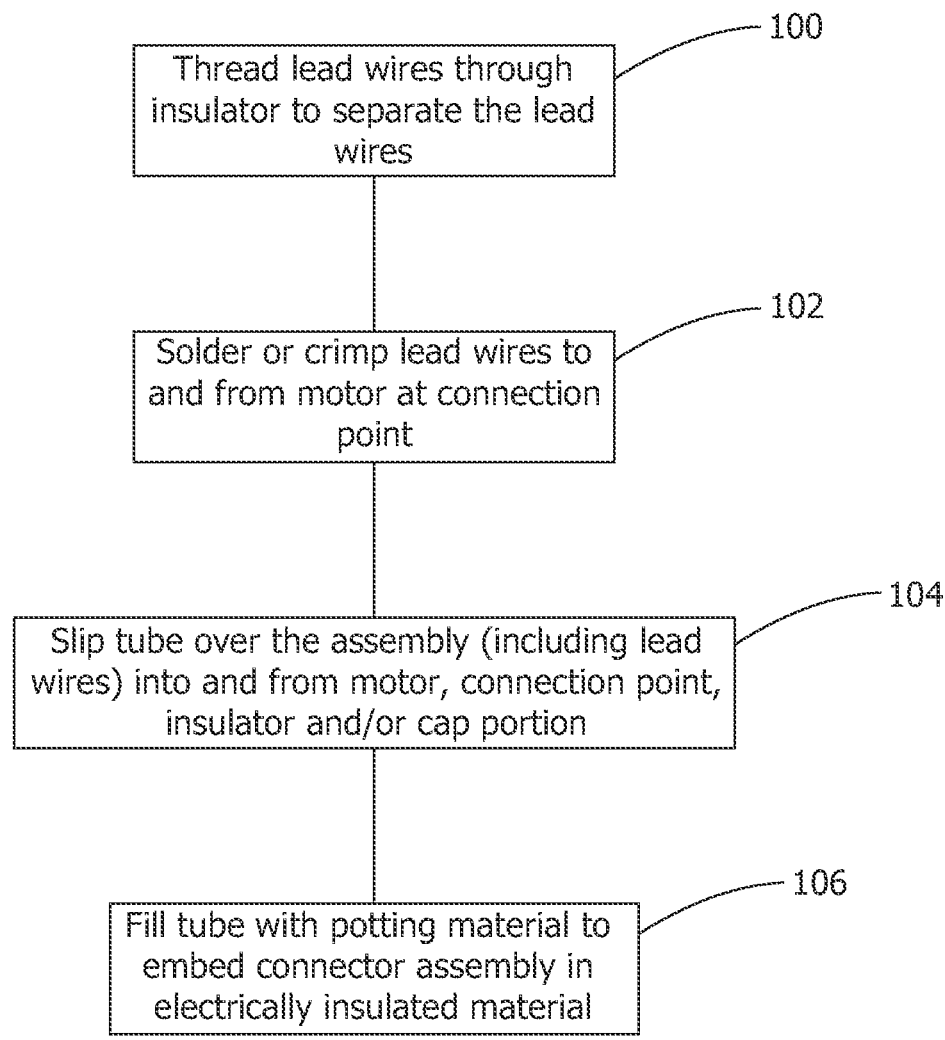
FIG. 3 shows an exemplary embodiment of a method of sealing a motor terminal.

Referring next to FIG. 3, a method of sealing electric motor terminals is disclosed. At step 100, the method proceeds by threading lead wires 12 through insulator 14 to separate the lead wires 12. Next, at step 102, lead wires 12 and the separate conductors in multiconductor cable 18 are soldered or crimped at connection point 20. Following step 102, at step 104 tube 22 is then slipped over the assembly (including lead wires 12, conductors in multiconductor cable 18, connection point 20, insulator 14, and cap portion 28). Finally, at step 106, tube 22 is filled with potting material 24 to embed the connector assembly in an electrically insulated material and prevent the ammonia atmosphere from causing a short circuit.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the sealed motor connector as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence.

The invention claimed is:

1. A sealed wire insulator for sealing motor terminals of a semi-hermetic compressor in an electrically conductive environment, the sealed wire insulator comprising:

an insulator/separator member comprising a plurality of apertures, wherein the plurality of apertures are configured to receive and thread a plurality of wire strands through the insulator/separator member, the plurality of wire strands extends from a motor or compressor housing of the semi-hermetic compressor, the insulator/separator member separates adjacent wire strands of the plurality of wire strands to create a space between the adjacent wire strands;

potting epoxy disposed in the space between the adjacent wire strands, wherein the potting epoxy is configured to provide an air tight seal between each of the plurality of wire strands and the adjacent wire strands and from the electrically conductive environment; and a hollow casing surrounding the insulator/separator member, the potting epoxy, and at least a portion of the plurality of wire strands.

2. The sealed wire insulator of claim 1, wherein the potting epoxy seals each of the plurality of wire strands from the electrically conductive environment, which comprises ammonia vapor or liquid.

3. The sealed wire insulator of claim 1, wherein the hollow casing is a shrink tube.

4. The sealed wire insulator of claim 1, wherein the insulator/separator member is cylindrical.

5. The sealed wire insulator of claim 1, wherein the insulator/separator member is a solid block.

6. The sealed wire insulator of claim 1, wherein the hollow casing is a molded casing.

7. The sealed wire insulator of claim 1, wherein the hollow casing comprises a narrow end and a wider end oppositely facing the narrow end.

8. The sealed wire insulator of claim 7, wherein the plurality of wire strands is terminated in a cap portion positioned proximate the wider end.

9. The sealed wire insulator of claim 1, wherein the potting material is selected from epoxy, urethane, silicone, or other suitable potting material having non-conductive properties.

10. A sealed wire insulator for sealing motor terminals of a semi-hermetic compressor in an environment comprising ammonia vapor or liquid, the sealed wire insulator comprising:

potting epoxy;

an insulator/separator member comprising a plurality of apertures, wherein the plurality of apertures are configured to receive and thread a plurality of lead wires through the insulator/separator member, the plurality of lead wires extends from a motor or compressor housing of the semi-hermetic compressor, and the insulator/separator member separates adjacent lead wires of the plurality of lead wires to create a space between the adjacent lead wires;

a hollow casing surrounding the insulator/separator member, the potting epoxy, and at least a portion of the plurality of lead wires, wherein the potting epoxy is infused into the hollow casing and fills the space between the adjacent lead wires and an additional space between the adjacent lead wires and the hollow molded casing, wherein the potting epoxy is configured to provide an air tight seal between each of the plurality of lead wires and the adjacent lead wires and with the environment.

11. The sealed wire insulator of claim 10, wherein the plurality of lead wires comprises Teflon-coated copper wire strands.

12. The sealed wire insulator of claim 10, wherein the plurality of lead wires comprises aluminum wire strands.

13. The sealed wire insulator of claim 10, wherein the plurality of lead wires comprises insulated coatings.

14. The sealed wire insulator of claim 10, wherein the hollow casing comprises a narrow end and a wider end oppositely facing the narrow end.

15. The sealed wire insulator of claim 14, wherein the plurality of lead wires is terminated in a cap portion positioned proximate the wider end.

16. The sealed wire insulator of claim 10, wherein the insulator/separator member is cylindrical.

17. The sealed wire insulator of claim 16, wherein the insulator/separator member is a solid block.

18. The sealed wire insulator of claim 10, wherein the potting material is selected from epoxy, urethane, silicone, or other suitable potting material having non-conductive properties.

19. A method for sealing wire terminations in a conductive atmosphere comprising:

threading a plurality of lead wire strands through a plurality of apertures in an insulator/separator member to form assembled connector parts;

attaching the plurality of lead wire strands to cable conductors at a connection point;

placing a casing over the assembled connector parts to form a connector assembly; and filling the casing with an airtight electrically insulated potting material to encase the connector assembly in the potting material.

20. The method of claim 19, wherein the casing is one of a tube or a molding.

* * * * *